UNITED STATES PATENT OFFICE.

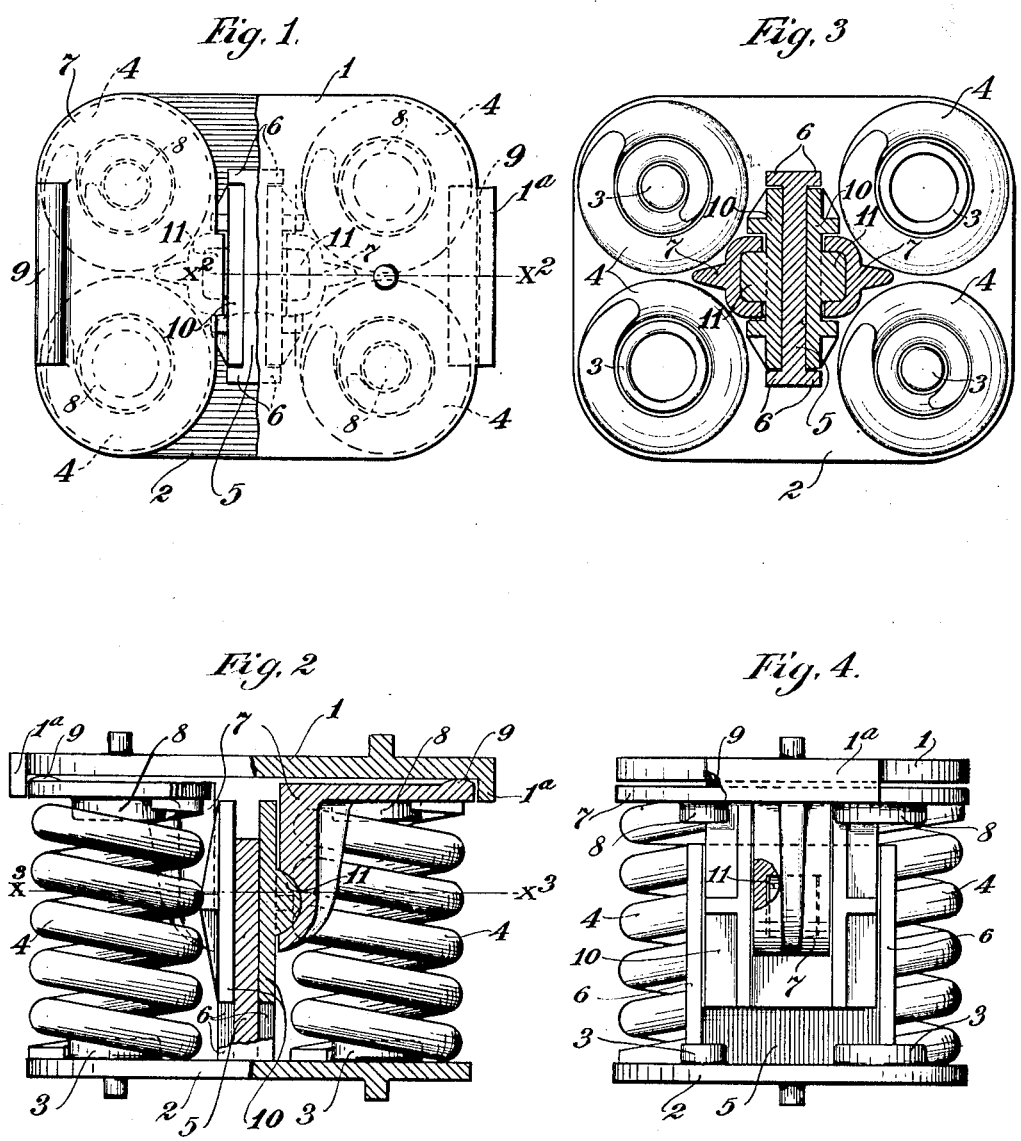

EDWIN C. WASHBURN, OF MINNEAPOLIS, MINNESOTA.

SPRING-CUSHION.

No. 882,279.        Specification of Letters Patent.      Patented March 17, 1908.

Application filed August 10, 1907. Serial No. 388,026.

*To all whom it may concern:*

Be it known that I, EDWIN C. WASHBURN, a citizen of the United States, residing at Minneapolis, in the county of Hennepin and State of Minnesota, have invented certain new and useful Improvements in Spring-Cushions; and I do hereby declare the following to be a full, clear, and exact description of the invention, such as will enable others skilled in the art to which it appertains to make and use the same.

My invention relates to spring cushioning devices and is particularly directed to an improved frictional spring dampener or device for reducing the vibrations of the springs.

To the above ends, the invention consists of the novel devices and combinations of devices hereinafter described and defined in the claims.

In the accompanying drawings which illustrate the invention, like characters indicate like parts throughout the several views.

Referring to the drawings, Figure 1 is a plan view, with some parts broken away, showing my invention incorporated in a spring cushion device having four coiled springs arranged in pairs. Fig. 2 is a view partly in side elevation and partly in vertical section, on the line $x^2$ $x^2$ of Fig. 1. Fig. 3 is a horizontal section taken on the line $x^3$ $x^3$ of Fig. 2; and Fig. 4 is a side elevation of the improved spring cushion, with one pair of springs removed.

The construction illustrated described in detail is as follows: The numerals 1 and 2 indicate, respectively, upper and lower spring bearing plates that are adapted for direct or indirect engagement with members whose movements are to be cushioned. The lower bearing plate 2 is provided with spring engaging bosses 3, in rectangular disposition, that telescope slightly into the lower ends of correspondingly positioned coiled cushioning springs 4. At its intermediate portion, the lower bearing plate 2 is provided with a rigidly secured upright friction plate 5, the opposite faces of which are channeled and are formed with marginal guide ribs 6.

The upper ends of the springs 4 that are on the same side of the friction plate 5 directly engage with the foot flanges of angle plates 7, which, as shown, are provided with bosses 8 that telescope slightly into the upper ends of said springs. In vertical cross section these so-called angle plates 7 are approximately rectangular and the depending arm portions thereof are intermediately located so that they come partly into the space formed between two coöperating springs. At their outer edges, the bases of the said angle plates are fulcrumed against the overlying bearing plate 1 and, as shown, they are formed with fulcrum ribs 9 that engage the said plate 1. To prevent outward slipping movements of the said angle plates, the bearing plate 1 is provided at its ends with stop flanges 1$^a$.

Friction plates or shoes 10 engage the opposite faces of the friction plate and are held against lateral displacement by the ribs 6 thereof. These friction plates or shoes 10 are pivotally connected to the depending arms of the angle plates 7, its pivotal connection, as shown, being accomplished by semi-cylindrical bearing lugs 11 on said plates 10 that engage correspondingly formed seats in the arms of the said angle plates 7.

By reference particularly to Fig. 2 it will be noted that the angle plates 7 engage with the bearing plate 1 only at their outer edges and, hence, are free for oscillatory movements on their fulcrum lugs 9. Under force tending to move the bearing plates 1 and 2 toward each other, the tension of the springs 4 exerted on the intermediate portions of the bases of the angle plates 7 presses the friction plates or shoes 10 against the friction plate 5 with a force that is approximately proportional to the impact of the force to be cushioned by the springs. When the springs are compressed, the friction plates 10, of course, must slide frictionally over the friction plate 5, and this same slippage under friction must take place under recoil of the springs. This friction device, herein called a spring dampener, therefore relieves the springs from intense strains due to sudden impacts and thereby greatly increases the cushioning power of the springs. The device also prevents sudden recoil of the springs which in some uses is even more important than increased cushioning action produced under compression of the springs.

A cushioning device of the kind above described is adapted for a great many different uses. It will be found serviceable for use in connection with car trucks and automobiles, but its utility is not limited to any particular application. Different applications of the device will, of course, call for modified arrangements thereof, both as to size, strength and design. It is, of course, evident that the device shown in the drawings may be used in any desired position and that if the device were turned upside down the so-called upper bearing plate would then become a lower bearing plate, and that the angle plates 7 would then be located at the bottom of the springs.

What I claim is:

1. The combination with a pair of bearing plates and a friction plate secured to one thereof, of a pair of reversely disposed angle plates fulcrumed against the other bearing plate, a pair of opposing friction shoes held against the opposite faces of said friction plate, by said angle plates, and coiled springs compressed between the bases of said angle plates and the bearing plate to which said friction plate is secured, substantially as described.

2. The combination with a pair of bearing plates and a friction plate secured to one thereof, of a pair of reversely acting angle plates fulcrumed at the outer edges of their bases to the other bearing plate and having arms intermediately extended from their inner edges, friction shoes pivotally connected to the arms of said angle plates and held thereby against the opposite faces of said friction plate, and coiled springs arranged in pairs and compressed between the bases of the coöperating angle plates and the bearing plate to which the said friction plate is secured, substantially as described.

3. The combination with bearing plates 1 and 2 and a friction plate 5 secured to and projecting from the latter, of angle plates 7 having fulcrumed lugs 9 at their outer edges engaging said plates 1 adjacent to its stop flanges 1ª, said angle plates also having bosses 8, coiled springs 4 compressed between said plate 2 and the bases of said angle plates 7 and telescoping with said bosses 3 and 8, and friction shoes 10 engaging the opposite faces of said friction plate 5 and having rounded bearing lugs 11 seated in the arms of said angle plates 7, substantially as described.

4. The combination with a pair of bearing plates and a friction plate secured to one thereof, of an angle plate fulcrumed against the other bearing plate, a friction shoe held against said friction plate, by said angle plate, and a coiled spring compressed between the base of said angle plate and the bearing plate to which said friction plate is secured, substantially as described.

In testimony whereof I affix my signature in presence of two witnesses.

EDWIN C. WASHBURN.

Witnesses:
MALIE HOEL,
H. D. KILGORE.